(12) United States Patent
Anderson et al.

(10) Patent No.: US 7,827,047 B2
(45) Date of Patent: Nov. 2, 2010

(54) METHODS AND SYSTEMS FOR ASSISTING SCHEDULING WITH AUTOMATION

(75) Inventors: Dave Anderson, Lawrenceville, GA (US); Robert A. Koch, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1068 days.

(21) Appl. No.: 10/603,448

(22) Filed: Jun. 24, 2003

(65) Prior Publication Data

US 2004/0267585 A1    Dec. 30, 2004

(51) Int. Cl.
*G06Q 10/00* (2006.01)
*G10L 11/00* (2006.01)
(52) U.S. Cl. .................. 705/5; 705/8; 704/270
(58) Field of Classification Search .......... None
See application file for complete search history.

(56) References Cited

U.S. PATENT DOCUMENTS

| | | | | |
|---|---|---|---|---|
| 6,044,465 | A * | 3/2000 | Dutcher et al. | 726/13 |
| 6,067,565 | A * | 5/2000 | Horvitz | 709/218 |
| 6,178,443 | B1 * | 1/2001 | Lin | 709/208 |
| 7,200,210 | B2 * | 4/2007 | Tang | 379/93.15 |
| 2001/0027439 | A1 * | 10/2001 | Holtzman et al. | 705/39 |
| 2001/0047264 | A1 * | 11/2001 | Roundtree | 704/275 |
| 2002/0035493 | A1 * | 3/2002 | Mozayeny et al. | 705/5 |
| 2003/0004772 | A1 * | 1/2003 | Dutta et al. | 705/8 |
| 2004/0078255 | A1 * | 4/2004 | Demsky et al. | 705/8 |

OTHER PUBLICATIONS

U.S. Appl. No. 10/610,266, entitled "Automated Methods and Systems for Assisting Customers in Making Purchases Utilizing Verbal Communication," filed Jun. 30, 2003; Inventor: Scott Stillman.

U.S. Appl. No. 10/603,403, entitled "Method and Systems for Assisting in Real Estate Transactions With Automation Utilizing Verbal Communication,:" filed Jun. 24, 2003, Inventors: David Anderson; Senis Busayapongchai.

(Continued)

*Primary Examiner*—David R Hudspeth
*Assistant Examiner*—Samuel Neway
(74) *Attorney, Agent, or Firm*—Fay Kaplun & Marcin, LLP

(57) ABSTRACT

Methods and systems provide scheduling assistance with automation. A party requesting scheduling can make the request to the automated system in various ways such as a voiced call to a voice services node, an email or instant message over the Internet, or a wireless data message from a wireless device. Request data based on the communication from the requesting party is compared to schedule data, such as by querying a database containing the schedule data. If the request data is compatible with the schedule data such that the request can be accommodated, then the schedule data is altered according to the request data to reflect the new scheduling. A notification may then be sent to the requesting party and/or the scheduling party owning the schedule to confirm the scheduling. For example, a voice services node may provide a verbal confirmation to the requesting party over the voiced call, or an email, instant message, or wireless data message may be sent to the requesting party. Likewise, an email, instant message, or a wireless data message may be sent to the scheduling party and/or a web site viewable by the scheduling party may display the updated schedule.

41 Claims, 6 Drawing Sheets

OTHER PUBLICATIONS

U.S. Appl. No. 10/610,045, entitled "Methods and Systems for Obtaining Profile Information From Individuals Using Automation," filed Jun. 30, 2003, Inventor: Scott Stillman.

U.S. Appl. No. 10/603,724, entitled "Methods and Systems for Establishing Games With Automation Using Verbal Communication," filed Jun. 24, 2003, Inventors: David Anderson; Senis Busayapongchai.

"i3 Mobile & Nuance," *ASRNews—Automatic Speech Recognition*, vol. 13, No. 8, Aug. 2002, Contact: Gwen Murphy.

"RezConnect," *ASRNews—Automatic Speech Recognition*, vol. 11, No. 2, Feb. 2000, Contact: Michael Brent.

"EbizPortals Bring Shopping to netECHO," *ASRNews—Automatic Speech Recognition*, vol. 12, No. 3, Mar. 2001, Contact: Dr. Emdad Khan.

"ViaFone & Ticketmaster," *ASRNews—Automatic Speech Recognition*, vol. 11, No. 7, Jul. 2000, Contact: Emily Cohen.

"CommWorks Enhances UC," *ASRNews—Automatic Speech Recognition*, vol. 13, No. 4, Apr. 2002, Contact: Steven M. Ostrowski; John Leikness.

"Fandango Provides Movie Tickets," *ASRNews—Automatic Speech Recognition*, vol. 13, No. 1, Jan. 2002, Contact: Sallie Green, Fandango.

\* cited by examiner

METHODS AND SYSTEMS FOR ASSISTING SCHEDULING WITH AUTOMATION

TECHNICAL FIELD

The present invention is related to scheduling such as making reservations or appointments. More particularly, the present invention is related to assisting with such scheduling with automation.

BACKGROUND

Scheduling of reservations, appointments, tee times and so forth is typically a manual task where one party directly communicates with another party, and this task can often result in inconvenience to both parties. Such direct communication requires that the party wishing to present a scheduling request seek out the other party such as by an in-person meeting, a voiced call such as a telephone call, or an email to communicate a schedule request. The requesting party is often inconvenienced because it may be difficult to successfully contact the scheduling party.

To complete the scheduling once the requesting party has successfully contacted the scheduling party, the scheduling party must verify that the schedule request is compatible with the current schedule by looking up the requested date, time, service, etc. to see what is available. This inconveniences the scheduling party because this requires time to communicate with the requesting party, then make the determination and update the schedule as necessary. Furthermore, the scheduling party may commit human error when making the determination and updating the schedule such that the scheduling is done incorrectly, to the detriment of both the scheduling party and the requesting party. Also, this determination may require a significant amount of time that causes the requesting party to experience uncertainty during the delay.

After the scheduling party makes the determination of whether the request can be accommodated, then the scheduling party must then communicate a response to the requesting party to inform the requesting party. This response may require that the scheduling party seek out the requesting party, especially where significant time has passed since the initial request was presented. The scheduling party-is inconvenienced because it may be difficult to successfully contact the requesting party.

SUMMARY

Embodiments of the present invention address these issues and others by providing methods and systems that assist scheduling tasks with automation. The automation takes a scheduling request, determines whether it can be accommodated based on the current schedule, and adapts the schedule to show that the request has been accommodated when possible. The automation may also provide a confirmation to the requesting party and/or the scheduling party to inform them of the handling of the request.

One embodiment is a method of assisting scheduling with automation. The method involves receiving a verbal scheduling request from a customer at a voice services node over a voiced call. A query is formulated to a schedule database based on the received verbal scheduling request to determine whether the request is compatible with a current schedule of the schedule database. When the request is compatible with the current schedule, the current schedule of the schedule database is adapted based on the scheduling request. A notification signal of the alteration to the current schedule is then generated.

Another embodiment is a method of assisting scheduling with automation utilizing verbal communication. The method involves receiving verbal answers for the schedule request from a customer at a voice services node. The set of verbal answers are interpreted to produce request data. The request data is compared to schedule data of a current schedule to determine whether the schedule request is compatible with the current schedule. When the request is compatible with the current schedule, then the schedule data of the current schedule is adapted based on the request data.

Another embodiment is a system for assisting scheduling with automation. The system includes a voice services node that receives a verbal scheduling request from a customer over a voiced call and provides scheduling request data for the scheduling request signal. A scheduling database contains data for a current schedule. A network-based computer-implemented scheduling application receives the scheduling request data from the node, compares the scheduling request data to the data for the current schedule to determine whether a scheduling request of the verbal scheduling request is compatible with the current schedule, and adapts the data for the current schedule based on the scheduling request data when the scheduling request is compatible with the current schedule.

Another embodiment is a system for assisting scheduling with automation utilizing verbal communication. The system includes a voice services node that converts question data to provide a set of verbal questions for a schedule request to a customer. The voice services node receives a set of verbal answers from the customer and converts the set of verbal answers into request data. A schedule database contains schedule data for a current schedule. A network-based computer-implemented application provides question data to the voice services node and receives the request data from the voice services node. The computer-implemented application compares the request data to the schedule data for the current schedule and adapts the schedule data according to the request data when the request data is compatible with the schedule data.

DETAILED DESCRIPTION

Embodiments of the present invention provide a customer with a network-based service that handles scheduling tasks such as reservations or appointments between the customer, i.e. the requesting party, and the scheduling party. The requesting party and scheduling party are free to interact with the automated system at their convenience to determine the scheduling rather than being required to attempt direct contact with each other.

Figure 1:
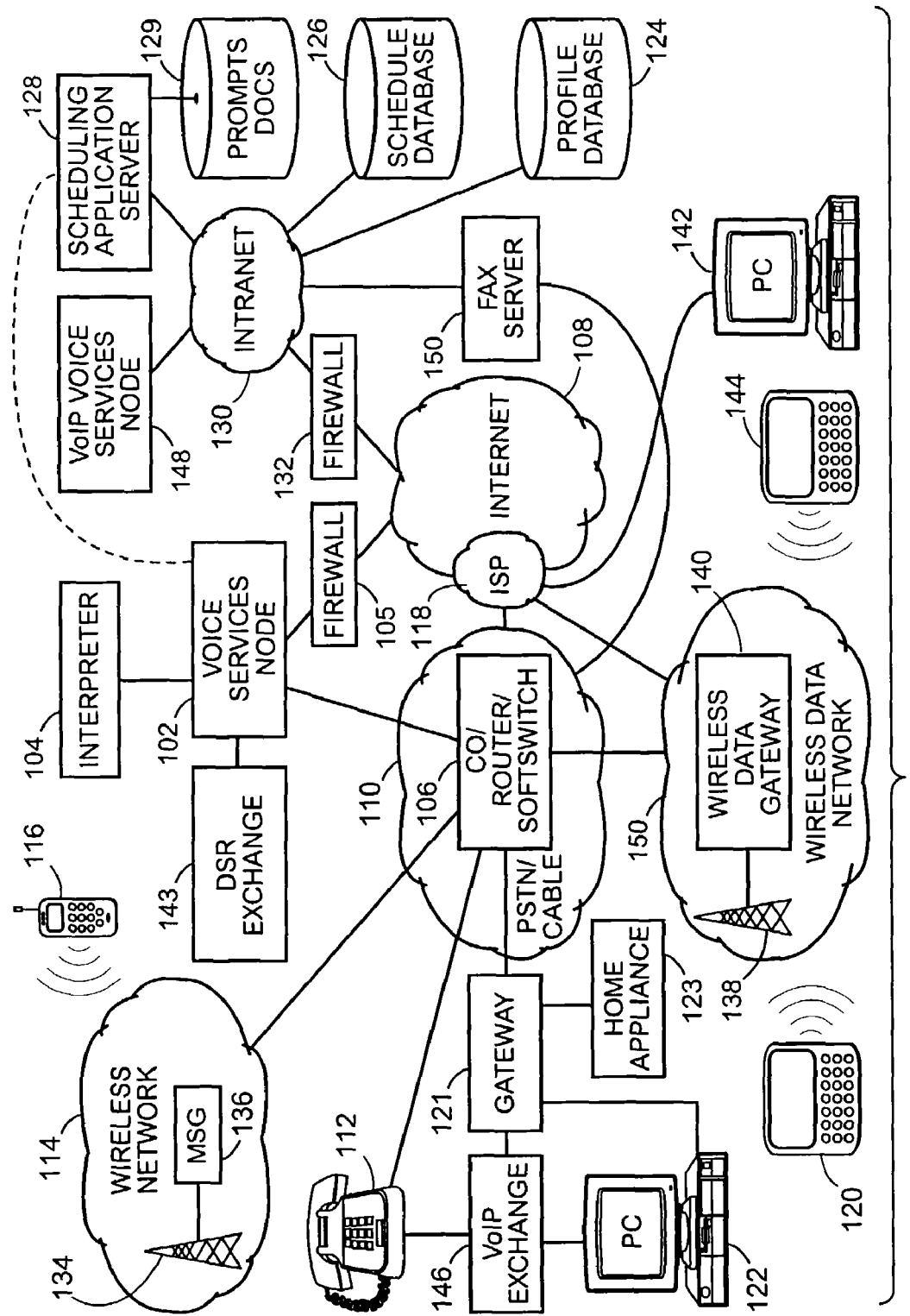
FIG. 1 shows an illustrative embodiment of a system for assisting customers in scheduling with automation where various forms of communication from the customer may occur including verbal communication over a voiced call and/or data communications.

FIG. 1 illustrates one example of an encompassing communications network interconnecting communications devices of the requesting party and the scheduling party with the network-based system that automates the scheduling process. The requesting party and scheduling party may access the system through several different channels of communication, including verbal channels. As discussed below, the customer communicates verbally with a voice services node that may be present in various locations for different embodiments.

As one example, the requesting party may place a conventional telephone call from a telephone 112 through a network 110 for carrying conventional telephone calls such as a public switched telephone network ("PSTN") or adapted cable network. The PSTN/cable network 110 receives the call at a central office 106 that provides software controlled switching of the incoming telephone calls as well as routing of data messages discussed below. The call terminates at a terminating voice services node 102 of the PSTN/cable network 110 according to the number dialed by the customer. This voice services node 102 is a common terminating point within an advanced intelligent network ("AIN") of modern PSTNs or adapted cable networks and is typically implemented as an intelligent peripheral or could otherwise be implemented as a soft switch and media server combination.

Another example of accessing the system is by the customer placing a voiced telephone call from a wireless phone 116. The wireless phone 116 maintains a wireless connection to a wireless network 114 that includes base stations 134 and switching centers 136 that are gateways to the PSTN 110. The PSTN 110 then directs the voiced call from the wireless phone 116 to the voice services node 102 according to the number dialed by the customer on the wireless phone 116. Furthermore, the wireless phone 116 may function as a thin client device relative to the verbal functions of the automated scheduling system such that the wireless phone 116 implements a distributed speech recognition ("DSR") platform to minimize the information transmitted through the wireless connection. The DSR platform takes the verbal communication received from the customer at the wireless device 116 and generates parameterization data from the verbal communication. The DSR platform then transmits the parameterization data as the verbal communication to the voice service node 102 or 136 rather than all the data representing the verbal communications. The voice services node 102 or 136 then utilizes a DSR exchange function 143 to translate the DSR parameterization data into representative text which the voice services node 102 or 136 can deliver to an application server 128.

Another example of accessing the system is by the customer placing a voiced call from a voice-over-IP ("VoIP") based device such as a personal computer 122 or where telephone 112 is a VoIP phone. This VoIP voiced call from the customer may be to a local VoIP exchange 146 which converts the VoIP communications from the customer's device into conventional telephone signals that are passed to the PSTN 110 and on to the voice services node 102. The VoIP exchange 146 converts the conventional telephone signals from the PSTN/cable network 10 to VoIP packet data that is then distributed to the telephone 112 or computer 122 where it becomes verbal information to the customer. Additionally, the wireless phone 116 may be VoIP capable such that communications to the wireless data network 114 include VoIP that is then converted to speech within the network 114 prior to being delivered to a voice services node 102.

The VoIP voiced call from the customer may alternatively be through an Internet gateway of the customer, such as a broadband connection or wireless data connection, to an Internet Service Provider ("ISP") 118. The ISP 118 interconnects the gateway of the customer or the wireless data network to the Internet 108 which then directs the VoIP voiced call according to the number dialed, which signifies an Internet address of a voice services node 148 of an intranet 130 from which the automated scheduling service is provided. The VoIP voiced call may originate from a PC 122 or other home appliance with integrated VoIP functionality such as a television. This intranet 130 is typically protected from the Internet 108 by a firewall 132. The voice service node 148 includes a VoIP interface and is typically implemented as a media server which performs the VoIP-voice conversion such as that performed by the VoIP exchange 146 but also performs text-to-speech and speech recognition such as that performed by the voice services node 102 and discussed below. Accordingly, the discussion of the functions of the voice services node 102 also applies to the functions of the voice service node 148.

As yet another example, the wireless device 116, 120, or 144 may be a wireless data device such as a personal digital assistant. The wireless device 116 and/or personal computer 122 may have a wi-fi wireless data connection, such as via IEEE 802.11, to the gateway 121 or directly to the wireless network 114 or wireless data network 150 such that the verbal communication received from the customer is encoded in data communications between the wi-fi device of the customer and the gateway 121 or wireless network 114.

Another example of accessing a voice services node 102 or 148 is through verbal interaction with an interactive home appliance 123. Such interactive home appliances may maintain connections to a local network of the customer as provided through a gateway 121 and may have access to outbound networks, including the PSTN/cable network 110 and/or the Internet 108. Thus, the verbal communication may be received at the home appliance 123 and then channel via VoIP through the Internet 108 to the voice services node 148 or may be channeled via the PSTN/cable network 110 to the voice services node 102.

Yet another example provides for the voice services node to be implemented in the gateway 121 or other local device of the customer so that the voice call with the customer is directly with the voice services node within the customer's local network rather than passing through the Internet 108 or PSTN/cable network 110. The data created by the voice services node from the verbal communication from the customer is then passed through the communications network 100, such as via a broadband connection through the PSTN/cable 110 and to the ISP 118 and Internet 108 and then on to the application server 128. Likewise, the data representing the verbal communication to be provided to the customer is provided over the communications network 100 back to the voice services node within the customer's local network where it is then converted into verbal communication provided to the customer.

The requesting party may also contact the automated scheduling service through non-verbal channels of communication with encoded verbal communication such as described above in the context of using a wi-fi connection. The requesting party may utilize non-verbal channels of communication to transmit verbal communication that has been encoded for transfer as data. Additionally, the requesting party may utilize non-verbal channels of communication to transmit and receive non-verbal data, such as a conventional email, instant messages, or pages.

For example, the requesting party may utilize a wireless data device 120 such as a personal digital assistant, a wireless pager, a wireless phone in data mode, or a wireless device also equipped as a thin client enabled with distributed speech recognition ("DSR") as discussed above which communicates through a wireless data network 150. The wireless data network 150 includes base stations 138 and gateways 140 to the Internet 108 through the ISP 118.

Likewise, the scheduling party may also communicate with the automated scheduling service through non-verbal channels of communication. For example, the scheduling party may utilize a wireless data device 144 that communicates through the wireless data network 150 including the base stations 138 and gateways 140 to the Internet 108. Alternatively, the scheduling party may utilize a personal computer 142 or other communications equipped appliance such as a television with a wireless or wireline data connection to the Internet through the ISP 108 over a data connection of the PSTN 110 or other data capable infrastructure. Thus, the scheduling party may upload or download scheduling information or be notified of schedule changes through various types of data messages such as emails, short messages, and/or instant messages or by visiting a web page posted by the automated scheduling service. Furthermore, the schedule may be provided as a display on the personal computer 142 or other communications equipped appliance and the updates made to the schedule by the automated scheduling service appear as the schedule display is refreshed.

Where verbal communications occur between the requesting party and the automated scheduling service, the voice services node 102 provides text-to-speech conversions and/or pre-recorded scripting to provide verbal communication to the requesting party over the voiced call and performs speech recognition and natural language understanding to receive verbal communication from the requesting party. Accordingly, the requesting party may carry on a natural language conversation with the voice services node 102. To perform these conversations, the voice services node 102 implements a platform such as the well-known voice extensible markup language ("VoiceXML") context which utilizes a VoiceXML interpreter function 104 of the voice services node 102 in conjunction with VoiceXML documents. Alternatively, the voice services node 102 may implement other well-known voice services platforms such as the speech language application tags ("SALT") platform. The interpreter function 104 operates upon the VoiceXML or SALT documents to produce verbal communication of a conversation. The VoiceXML or SALT document provides the content to be spoken from the voice services node 102. The VoiceXML or SALT document is received by the VoiceXML or SALT interpreter function 104 from an application server 128, discussed below, through a data network connection of the communications network 100 in response to a voiced call being established with the requesting party at the voice services node 102. This data network connection as shown in the illustrative system of FIG. 1 includes a link through a firewall 105 to the Internet 108 and on through the firewall 132 to the intranet 130.

The verbal communication from the requesting party is received at the voice services node 102 and is converted into data representing each of the spoken words through a conventional speech recognition function of the voice services node 102. The VoiceXML or SALT document that the VoiceXML or SALT interpreter 104 is operating: upon sets forth a timing of when verbal information that has been received and converted to data is packaged in a particular request back to the VoiceXML or SALT document application server 128 over the data network. This timing provided by the VoiceXML or SALT document allows the verbal responses of the requesting party to be matched with the verbal questions and responses of the VoiceXML or SALT document. Matching the communication of the requesting party to the communication from the voice services node enables an application server 128 of the intranet 130 to properly act upon the verbal communication from the requesting party. As shown, the application server 128 may interact with a voice services node through an intranet 130, through the Internet 108, or through a more direct network data connection as indicated by the dashed line.

The application server 128 is a conventional computer server that implements an application program to control the automated scheduling service for the requesting party and the scheduling party. The application server 128 may additionally or alternatively provide files of pre-recorded verbal prompts to the voice services node where the file is implemented to produce verbal communication. The application server 128 may store the various pre-recorded prompts, grammars, and VoiceXML or SALT documents in a database 129. The application server 128 may receive data corresponding to verbal communication from a requesting party and may act upon keywords of the representative data to formulate schedule requests. The application server 128 may alternatively receive data messages from the requesting party such as emails, short messages, instant messages, or entries through a web page template. These data messages contain the data that the application server 128 utilizes for the schedule request.

It will be appreciated that the functions of the application server 128 may be divided and hosted separately. The scheduling server portion providing the interaction with the scheduling database(s) 126 and profile database(s) 124 may be within an intranet 130 while the VoiceXML or SALT application may be hosted elsewhere, such as proximate to the voice services node 102 and interpreter 104 as part of a voice portal service. Thus, references to an application server 128 are intended to refer to the hosting of both the scheduling and voice portal functions, either as integrated functionality of one or more servers on the intranet 130 or as separately hosted functionality linked through network connection.

For a configuration of the automated scheduling service as shown in FIG. 1 where the service is specific to one scheduling party, then such schedule request data specifies the identity of the requesting party, a time to schedule, a date to schedule, and any preferences of the requesting party such as the particular service to be provided or a detail about the service. For example, the schedule request may be a restaurant reservation request that specifies that the non-smoking section is desired. For a configuration of the automated scheduling service, shown in FIG. 2 and discussed in more detail below, where the service is applicable to multiple and varied scheduling parties, then the schedule request data also specifies the identity of the business that is to be the scheduling party for this particular request.

The application server 128 may also interact with a profile database 124 that is populated with information that is obtained from the requesting party through previous verbal communication or data messages or by tracking previous scheduling requests. For example, the profile database 124 may have various categories of information stored for each requesting party who utilizes the automated scheduling service, such as the preference of smoking versus non-smoking for a restaurant or tee times for specific days. The application server 128 accesses the relevant profile data for a particular schedule request from a requesting party to fill in any details not yet provided or omitted by the communication from the party. For example, the requesting party may request that a restaurant reservation be made but then does not specify smoking versus non-smoking. The application server 128 may access the profile database 124 for the requesting party to determine the appropriate choice before prompting the caller.

As shown in FIG. 1, the profile database 124 may reside on the intranet 130 for the network-based scheduling service. However, the profile database 124 likely contains information that the requesting party considers to be sensitive. Accordingly, an alternative is to provide profile database storage at the requesting party's residence or place of business so that the requesting party feels that the profile data is more secure and is within the control of the requesting party. In this case, the application server 128 maintains an address of the profile database storage maintained by the requesting party rather than maintaining an address of the customer profile database 124 of the intranet 130 so that it can access the profile data as necessary.

The application server 128 also interacts with a scheduling database 126 that stores scheduling data for the scheduling party for which the automated scheduling service is applicable. The scheduling data is a calendar containing available and/or booked time slots as well as available preferences for each time slot. For example, the scheduling data for a restaurant shows the available time slots with the available preferences for each and also contains the booked time slots with any preferences for each booking. When a scheduling request is received by the application server 128, the details of the request are compared to the availabilities of the current schedule as indicated by the scheduling data to determine whether the request is compatible with the current schedule. Where the request is compatible because it fits within the availabilities of the schedule, then the application server 128 then alters the schedule data as appropriate to reflect the request and may also provide notification to both the requesting party and the scheduling party of the change to the schedule. Where the request is not compatible, then the application server 128 does not alter the schedule but instead provides a notification to the requesting party that the request cannot be accommodated. The application server 128 may also offer the requesting party an alternative based on adjoining times with comparable preferences. Such notifications may be verbal over a voiced call or may be a return data message.

For verbal communications with the requesting party, the application server 128 provides VoiceXML or SALT documents to the voice services node 102 to bring about the conversation with the requesting party over the voiced call through the PSTN 110 and/or to the voice services node 148 to bring about the conversation with the requesting party over the VoIP Internet voice call. In addition to providing VoiceXML or SALT documents to the one or more voice services nodes of the encompassing communications network 100, the application server 128 may also serve hypertext markup language ("HTML"), wireless application protocol ("WAP"), or other distributed document formats depending upon the manner in which the application server 128 has been accessed. For example, as discussed above, a requesting party may choose to send the application server 128 profile information and/or a schedule request by accessing a web page provided by the application server to the personal computer 122 through HTML or to the wireless device 120 through WAP via a data connection between the wireless data network 150 and the ISP 118. Such HTML or WAP pages may provide a template for entering information where the template asks a question and provides an entry field for the requesting party to enter an answer that will be stored in the profile database 124 or will be used to formulate a schedule request.

The application server 128 may also interact with a fax server 150 over the intranet 130 to provide faxed notifications of schedulings to requesting and scheduling parties. The fax server 150 may place faxed calls to fax machines of the scheduling and requesting parties through the PSTN/cable network 110.

Figure 2:
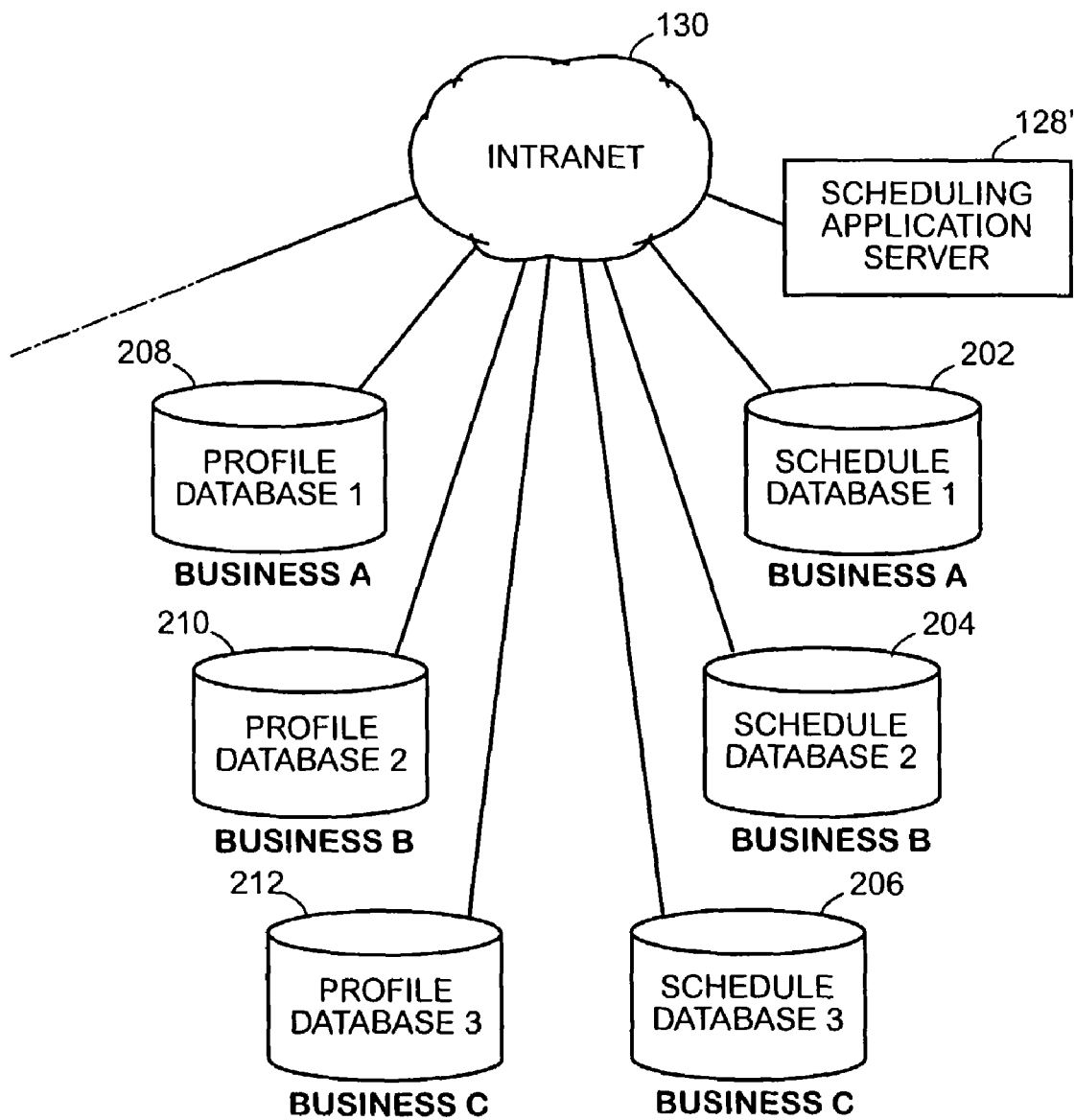
FIG. 2 shows an illustrative embodiment of an application and database portion of a system for assisting customers in scheduling with automation.

While FIG. 1 illustrates the configuration of the automated service utilizing a scheduling database 126 that is devoted to the scheduling party, or is part of a centralized service that is applicable to multiple scheduling parties so that a requesting party can contact the service to submit a scheduling request for a variety of different businesses. In this situation, the request specifies the particular scheduling party for which the scheduling request is intended. The configuration of the automated scheduling service that is applicable to multiple scheduling parties is shown in FIG. 2. As shown in FIG. 2, multiple scheduling databases 202, 204, and 206 are provided for the separate scheduling parties that are included in the options of the automated scheduling service. While FIG. 2 illustrates three separate databases with three separate connections to the intranet 130, it will be appreciated that the databases may be separate segments of a single database structure where each segment is individually addressable by the application server 128' over a single network connection from the intranet 130. The application server 128' obtains the identity of the scheduling party from the schedule request and accesses the appropriate database or segment accordingly to determine whether the request is compatible with the current schedule.

This multi-business approach could also be used to search for available options for a reservation or appointment among several competing scheduling parties. For example, the scheduling party may establish a business method whereby it acts as a "broker" for several competing businesses, e.g., restaurants. The requesting party might, for example, submit a request for restaurant reservations in the theater district for a specific day at a specific time. The scheduling party can respond to the requesting party with available options, screening out those that are not available.

As shown in FIG. 2, there may also be individual profile databases 208, 210, and 212 for each scheduling party so that a requesting party has preferences for one business stored in one database while the preferences of the requesting party for another business are stored in another database. As with the scheduling databases, it will be appreciated that the individual profile databases for each business may instead be segments of a database with one connection back to the intranet 130 as opposed to individual databases each with a separate connection. Upon the application server 128' obtaining the identity of the requesting party and the scheduling party from the schedule request, the appropriate profile database or segment may then be accessed to determine the preferences of the requesting party for the relevant scheduling party.

Figure 3:
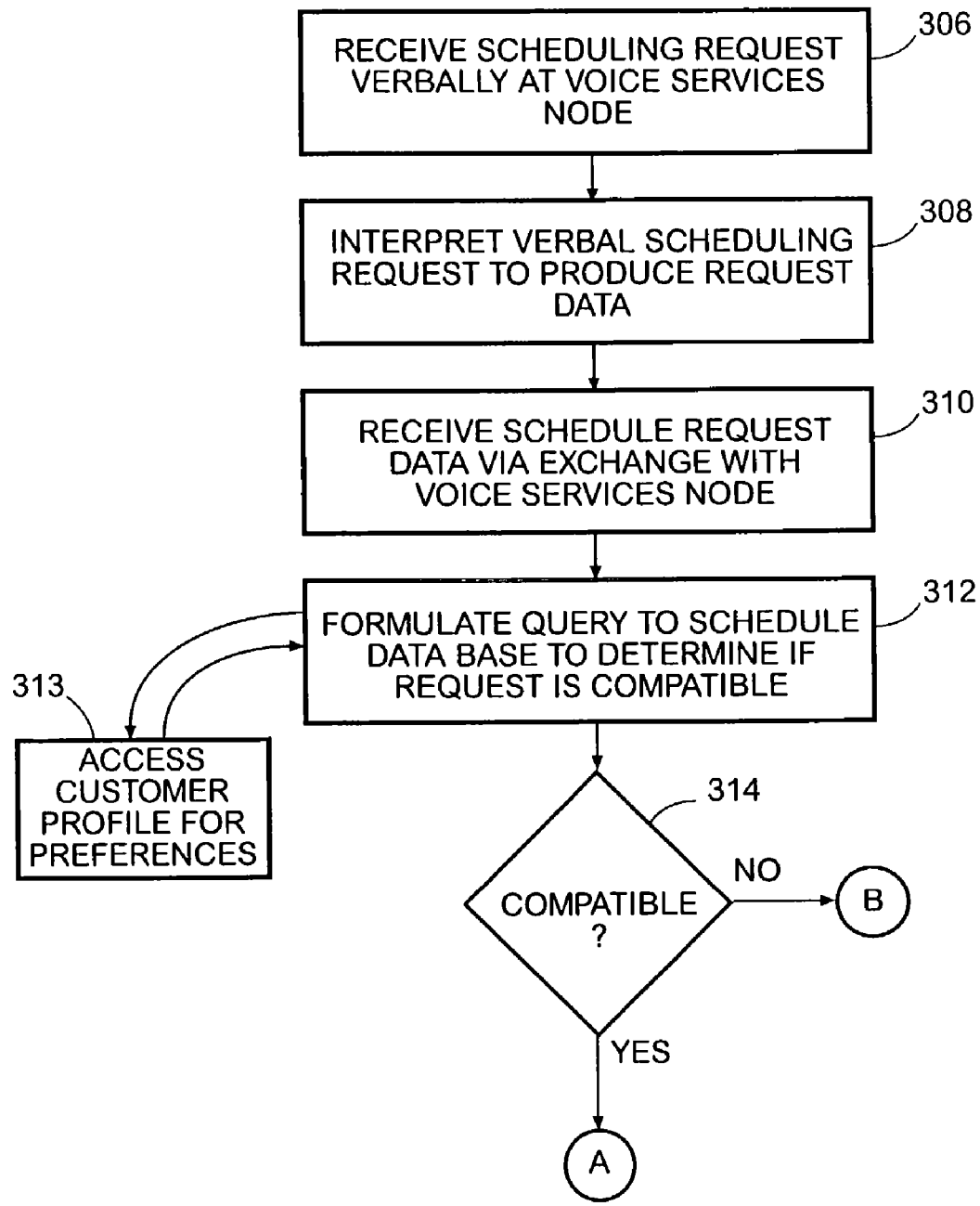
FIGS. 3-5 illustrate one example of a set of logical operations that may be performed within the system of FIG. 1.
Figure 4:
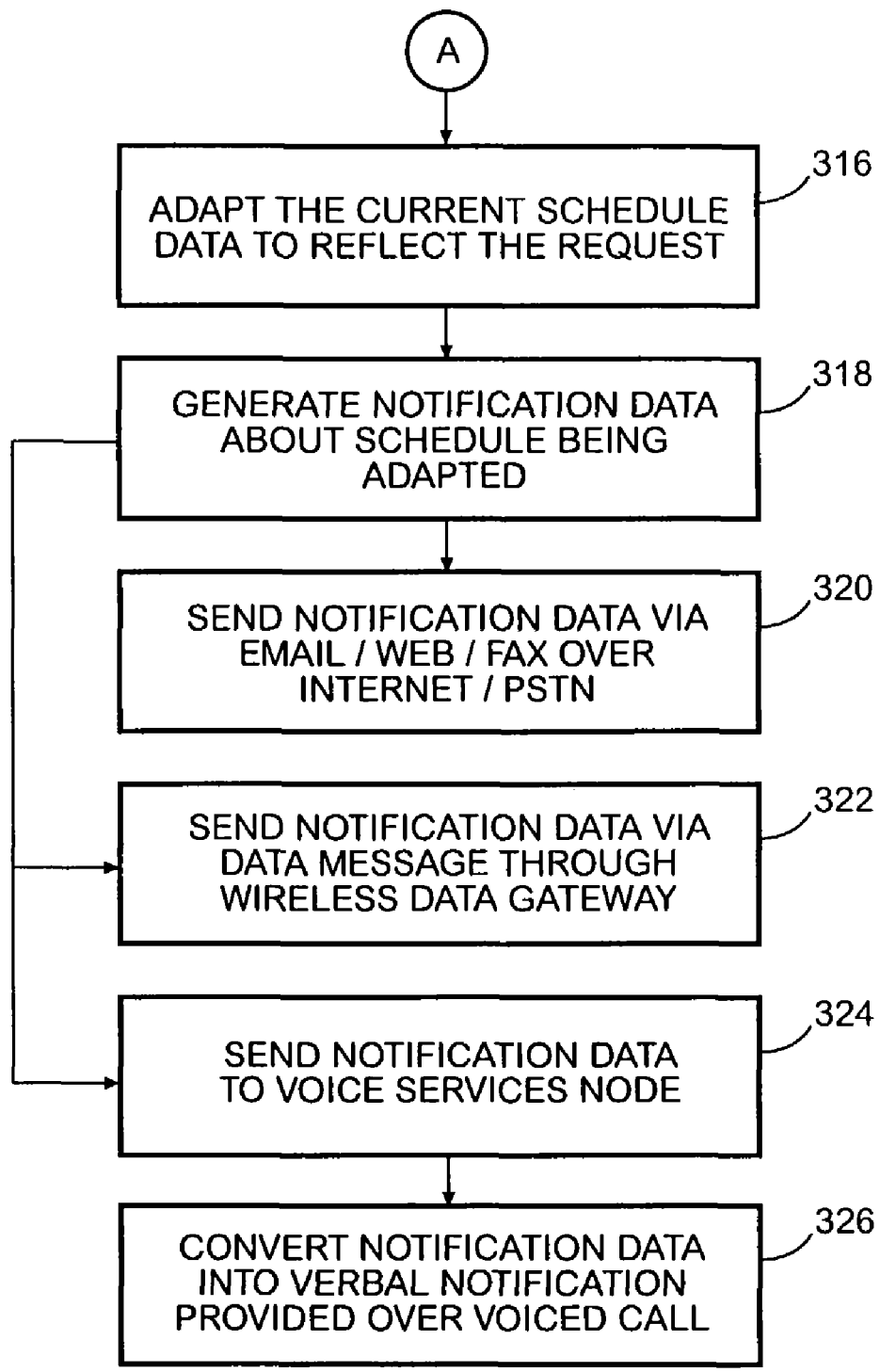
Figure 5:
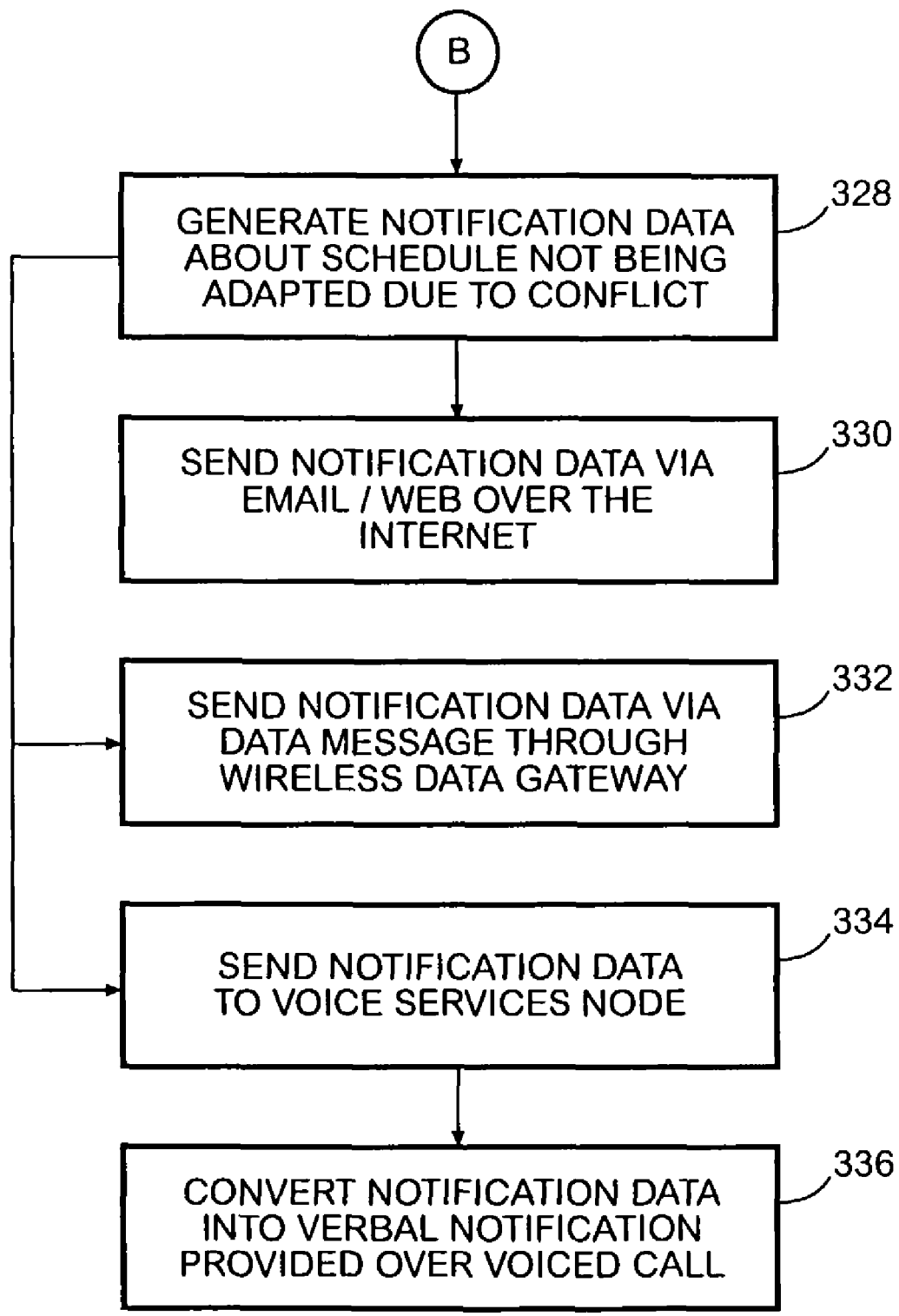

FIGS. 3-5 illustrate one example of logical operations that may be performed within the communications network 100 of FIG. 1 to bring about the automated scheduling for the requesting party and scheduling party. This set of logical operations is provided for purposes of illustration and is not intended to be limiting. For example, these logical operations demonstrate support for various channels of communication between the requesting party, scheduling party, and the automated service. However, it will be appreciated that other types and any number of channels of communication may be supported, including transfer to a human agent for the scheduling party.

The logical operations begin at request operation 306 where a scheduling request is received verbally through a voiced call placed to a voice services node. The details of request operation 306 are discussed in more detail below with reference to FIG. 6. At recognition operation 308, the verbal scheduling request is interpreted by the voice services node utilizing speech recognition and natural language understanding to produce request data that is textual data which is the representative meaning of the words spoken by the requesting party. The request data is exchanged with the application server at exchange operation 310. Operational flow then proceeds to database operation 312.

At database operation 312, the application server formulates a query to the scheduling database to determine if the request is compatible with the current schedule. The query is formulated based upon the keywords of the request data that has been received from the voice services node. Where the request omits or has yet to provide some information that may be included in the query, the application server may access the profile database to search for preferences of the requesting party to complete the formulation of the query. The application server obtains the preferences of the customer from the profile database at access operation 313. Where critical information of the request has been omitted, such as the date or time, then the application server may send a communication back to the requesting party to ask for the missing information. This communication may be of the same form as the request that has been submitted, such as a reply email, instant message, or data message or a verbal reply over the voiced call. The details of the verbal reply are discussed in more detail below with reference to FIG. 6.

Upon the application server completing the formulation of the query to the scheduling database, query operation 314 detects whether the request is compatible with the current schedule. As discussed above, this is done by comparing the details of the request included in the query to the schedule data for the current schedule to determine whether the request can be accommodated by available time slots and preferences of the current schedule. When the request is compatible with the current schedule, then operational flow proceeds to schedule operation 316 of FIG. 4. When the request is not compatible with the current schedule, then operational flow proceeds to notification operation 328.

At schedule operation 316, the application server updates the current schedule data of the schedule database to reflect the schedule request by adapting the data of the schedule database as necessary. The requested time slot of the current schedule is flagged as booked with the details of the requesting party and the preferences of the scheduling request. The application server then generates a notification of the change to the schedule at notification operation 318. The notification is then delivered to the intended recipients, such as the requesting party and/or the scheduling party. The delivery may be of various forms depending upon the channels of communication that are available to the requesting party and the scheduling party.

Where the requesting party and/or scheduling party has email or web site access, the notification is provided as an email message or message posting to a web site at message operation 320. Where the requesting party and/or scheduling party has a wireless data device, the notification is provided as a data message such as a short message, instant message, or pushed as an email message to the wireless data device through the wireless data gateway at message operation 322. Where the requesting party has placed a voiced call to the automated service such as through a home telephone or a wireless phone, then notification VoiceXML or SALT data is provided to the voice services node at exchange operation 324. Then the voice services node converts the notification VoiceXML or SALT data to speech over the voiced call to the requesting party at speech operation 326 to complete the notification. The requesting party may also engage in a bimodal session where by both voiced and data communications occur such that a notification involves both a voiced message and a data message. For example, a. voiced message may notify the requesting party that an email, other data message, or fax confirmation will be sent.

When operational flow transitions to notification operation 328 of FIG. 5, the application server generates notification data about the schedule not being adapted to reflect the request due to a conflict. The notification may provide suggestions to the requesting party such as availabilities that are similar to the request that has been submitted and that have been determined through the query to the requesting party's profile and to the scheduling database. For example, a reservation request to a restaurant may result in no compatibility at a particular time in the non-smoking section but that the smoking section would be available at that time, so the notification indicates that the smoking section is available at that same time if the requesting party would like to reserve it instead. The notification is then delivered to the requesting party, and the delivery of this notification may also be of various forms depending upon the channels of communication that are available to the requesting party.

Where the requesting party has email or web site access, the notification is provided as an email message or message posting to a web site at message operation 330. Where the requesting party has a wireless data device, the notification is provided as a data message such as a short message, instant message, or pushed as an email message to the wireless data device through the wireless data gateway at message operation 332. Where the requesting party has placed a voiced call to the automated service such as through a home telephone or a wireless phone, then notification VoiceXML or SALT data is provided to the voice services node at exchange operation 334. Then the voice services node converts the notification VoiceXML or SALT data to speech over the voiced call to the requesting party at speech operation 336 to complete the notification. Again, for bi-modal sessions, the notification may be provided verbally through a voiced call with the requesting party and inform the requesting party that an email, fax, or other notification will also be sent. Upon being notified that the request has not been accommodated, the requesting party may submit a different request, such as by changing a parameter or by accepting a suggestion that has been provided in the notification. It will be appreciated that other voiced calls, as discussed above, may support this request notification exchange.

Figure 6:
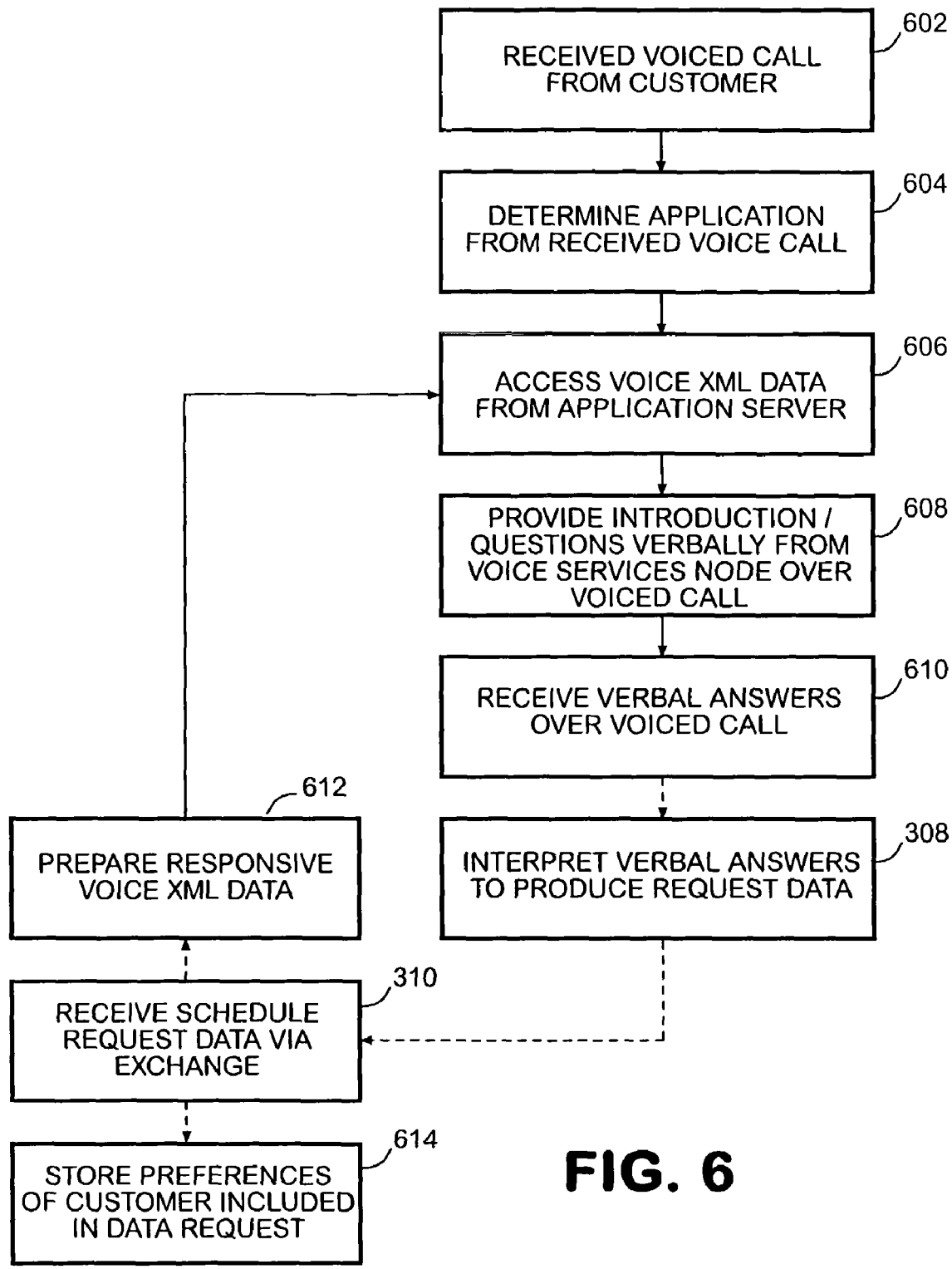
FIG. 6 illustrates one example of a set of logical operations that establish verbal interaction over a voiced call with a customer in conjunction with the logical operations of FIGS. 3-5.

FIG. 6 illustrates one example of the logical operations that are involved in receiving a verbal request from a requesting party. This set of logical operations is provided for purposes of illustration and is not intended to be limiting. For example, these logical operations discuss the application of VoiceXML or SALT within the communications network 100. However, it will be appreciated that alternative platforms for distribution of recorded prompts, text-to-speech, speech recognition, and natural language understanding may be used in place of VoiceXML, such as SALT as discussed above or a proprietary, less open method.

The logical operations of FIG. 6 begin at call operation 602 where the requesting party places a voiced call to a voice services node such as by dialing the number for the scheduling service for the voice services node on the communications network or by selecting an icon on the personal computer where the voiced call is placed through the computer. The voice services node determines the particular service the requesting party wishes to use based on the number the requesting party dialed, the icon selected, or other indicator provided via the voice call at service operation 604. At access operation 606, the voice services node accesses the appropriate application server according to the voice call (i.e., according to the number dialed, icon selected, or other indicator provided by the customer). Utilizing the dialed number or other indicator of a voiced call to distinguish one application server from another allows a single voice services node to accommodate multiple verbal communication services simultaneously. The voice services node may provide identification data to the application server for the requesting party based on the received caller ID information for the requesting party which allows the application server to access the profile for the requesting party as well as formulate the query to the scheduling database to reserve the time slot for the requesting party.

Alternatively, the voice services node may implement a standard VoiceXML introduction page to inform the requesting party that he has dialed into the service and ask that the requesting party say his formal name or other form of identification, such as a user name and password. This identification can then be captured as data and provided back to the application server where it is utilized to access the profile for the requesting party.

Once the voice services node receives the VoiceXML page data, it is interpreted at speech operation 608 to convert the VoiceXML text to speech or retrieve pre-recorded prompts that are then verbally provided to the requesting party. This verbal information may provide further introduction and guidance to the requesting party about using the system. This guidance may inform the requesting party that he can barge in at any time with a question or with an instruction. The guidance may also specifically ask that the requesting party provide a verbal command, such as a scheduling request (and subsequent business name where multiple businesses are supported) or a request to update the profile data.

Eventually, the voice services node receives a verbal request from the requesting party at request operation 610. This verbal request may be detailed so that it provides many preferences that would otherwise be found in the profile for the requesting party. This request may also be more general, such as a scheduling request that does not specify any preferences such that the profile data will be relied upon to formulate the query to the scheduling database. Operational flow then transitions to recognition operation 308 and exchange operation 310 discussed above with reference to FIG. 3.

Upon the application server receiving the request data at exchange operation 310, the application server determines whether the requesting party intended to request scheduling or request an update to the profile database. When the request is to update the profile database, then the application server updates the database according to the request data specifying the change at preferences operation 614. When the request is a scheduling request, then the application server determines whether all the necessary information for formulating a request has been provided either from the request or from accessing the profile database. The application server then prepares responsive VoiceXML data of a VoiceXML document at response operation 612.

The responsive VoiceXML data instructs the voice services node to verbally communicate with the requesting party. The communication may request that the requesting party provide additional information about the scheduling where the application server has detected that a piece of necessary information is missing, such as the time of day to be scheduled. Where the request data is complete, the communication may inform the requesting party that the request is being handled and that a response will be provided upon verifying whether the request can be accommodated. Upon the application server preparing the VoiceXML data specifying the communication, the VoiceXML document is provided to the voice services node at access operation 606, and operational flow continues.

It will be appreciated that the scheduling party may also be a requesting party to the automated scheduling service should this party desire to secure an appointment or reservation independent of any direct access to the scheduling database 126. Likewise, it will be appreciated that the above processes defined to request a schedule slot can be employed by the business to update a schedule capacity and related features. The automated system recognizes the scheduling party from the manner in which the service is accessed or through an explicit request for identification, and then the scheduling party may request that the automated service update capacity as indicated by the scheduling party. Accordingly, in one interaction, a mobile employee can report capacity over a voiced network connection in real time as the mobile employee is viewing the available capacity, such as viewing available tables in a restaurant. Thus, as capacity increases or decreases, the scheduling party can access the automated service and instruct that the changes in capacity be reflected.

The embodiments of the automated scheduling system discussed above allow a requesting party to submit a request that is received by the system over one of various channels of communication and is then acted upon by the system to attempt to accommodate the request. The requesting party and/or scheduling party are notified upon the schedule being altered to reflect the request or upon the request being rejected due to a conflict with the current schedule. Thus, the requesting party and the scheduling party are not required to be in direct communication, and the scheduling party is not required to mind the schedule to check for conflicts upon receiving a request. Furthermore, the scheduling party may utilize the automated scheduling system to update the supply and demand reflected by the scheduling database.

Additionally, the scheduling party may use the automated scheduling service to notify requesting parties that the scheduling request such as an appointment or reservation is pending or is ready "now." In this fashion, the automated scheduling system also provides a reminder or a notification of "ready" for customers equipped with a PDA or other wireless communications device, thereby displacing the need for a custom, short range wireless paging device at the point of service.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of assisting scheduling with automation, the method comprising:
   receiving a verbal scheduling request from a customer at a voice services node;
   formulating request data to a schedule database, the request data being formulated based on keywords of the verbal scheduling request received from the customer, wherein formulating the request data comprises:
      accessing a profile for the customer from a profile database to deteintine preferences for the customer, the profile database comprising a profile database storage maintained only at a premises of the customer, the preferences being previously obtained through at least one of the following: previous verbal communication with the customer, data message transaction with the customer, and tracking previous scheduling requests made by the customer, and including the preferences in the request data, when information contained in the preferences is omitted in the request data, to determine whether the request is compatible with a current schedule, wherein including the preferences comprises:

accessing the profile for the customer from the profile database, searching for the preferences containing the information omitted in the request data, and updating the request data to include the preferences containing the information omitted in the request data, wherein updating the request data to include the preferences containing the information omitted in the request data does not require further customer interaction;

receiving a scheduling update signal from a schedule owner, the scheduling update signal providing an indication of availability for the current schedule stored in the schedule database, the indication of availability including a quantitative capacity;

formulating a command to the schedule database based on the received scheduling update signal to update the current schedule;

comparing the request data to the current schedule of the schedule database to determine whether the request data is compatible with the current schedule of the schedule database, wherein the update to the current schedule is considered when determining whether the request is compatible;

when the request is compatible with the current schedule, altering the current schedule of the schedule database based on the request data; and generating a notification signal of the alteration to the current schedule.

2. The method of claim 1, further comprising interpreting the verbal schedule request to produce the request data.

3. The method of claim 1, wherein the verbal scheduling request is a voice-over-IP call.

4. The method of claim 1, wherein the verbal scheduling request is received over a public switched telephone network.

5. The method of claim 1, wherein receiving the scheduling request comprises receiving a wireless data transmission from a wireless device in use by the customer and extracting the request data from the verbal scheduling request of the wireless data transmission.

6. The method of claim 1, wherein the notification comprises a confirmation provided to the customer.

7. The method of claim 6, wherein the confirmation is a verbal confirmation provided from a voice services node.

8. The method of claim 7, wherein the confirmation is an email provided to the customer over the Internet in addition to the verbal confirmation.

9. The method of claim 7, wherein the confirmation is a wireless data message provided to a wireless device of the customer in addition to the verbal confirmation.

10. The method of claim 1, wherein the notification comprises a confirmation provided to the schedule owner.

11. The method of claim 10, wherein the confirmation is a web site displaying the current schedule.

12. The method of claim 10, wherein the confirmation is a wireless data message provided to a wireless device of the schedule owner.

13. The method of claim 1, wherein the notification signal comprises a confirmation provided to the customer by providing a verbal notice from a voice services node and by providing an electronically delivered non-verbal message.

14. The method of claim 1, wherein the indication of availability specifies an accepted schedule request decreasing remaining capacity.

15. A method of assisting scheduling with automation utilizing verbal communication, the method comprising:

receiving a set of verbal responses for a schedule request from a customer at a voice services node;

interpreting the set of verbal responses to produce request data, the request data being based on keywords of the set of verbal responses received from the customer;

accessing a profile database, the profile database comprising a profile database storage maintained only at a premises of the customer, to search for preferences containing information omitted in the request data, the preferences being previously obtained through at least one of the following: previous verbal communication with the customer, data message transaction with the customer, and tracking previous scheduling requests made by the customer;

including the preferences containing the information omitted in the request when information is omitted in the request data, wherein including the preferences comprises:

accessing the profile database, searching for the preferences containing the information omitted in the request data, and updating the request data to include the preferences containing the information omitted in the request data, wherein updating the request data to include the preferences containing the information omitted in the request data does not require further customer interaction;

receiving a scheduling update signal from a schedule owner, the scheduling update signal providing an indication of availability for the current schedule stored in the schedule database, the indication of availability including a quantitative capacity;

formulating a command to the schedule database based on the received scheduling update signal to update the current schedule;

comparing the request data to schedule data of a current schedule to determine whether the schedule request is compatible with the current schedule, wherein the update to the current schedule is considered when determining whether the request is compatible; and when the request is compatible with the current schedule, then adapting the schedule data of the current schedule based on the request data.

16. The method of claim 15, further comprising providing a set of verbal questions for a schedule request from the voice services node to the customer, wherein the set of verbal questions includes a question about a business name of interest to the customer.

17. The method of claim 15, further comprising providing a set of verbal questions for a schedule request from the voice services node to the customer, wherein the set of verbal questions includes a question about a date and time of day to schedule.

18. The method of claim 15, further comprising providing a set of verbal questions for a schedule request from the voice services node to the customer, wherein the set of verbal questions includes questions about customer preferences.

19. The method of claim 15, further comprising:

determining additional preferences of the customer from the request data to produce preference data; and storing the preference data of the customer in the profile database.

20. The method of claim 19, further comprising:
accessing the profile database storing preference data of the customer; and
when comparing the request data to the schedule data, also comparing preference data to the schedule data to further determine whether the schedule request is compatible with the current schedule.

21. The method of claim 20, wherein the customer places a voiced call to the voice services node, wherein storing the preference data comprises mapping an identifier of the voiced call from the customer to the location of the customer profile data containing the stored preference data, and wherein accessing the profile database comprises upon subsequent voiced calls having the electronic identifier to the voice services node, accessing the preference data for the customer based on the identifier.

22. The method of claim 21, wherein the customer provides a verbal customer identification as a verbal answer to the voice services node and wherein the verbal customer identification is interpreted to produce customer identification data, and wherein mapping the identifier of the voiced call further comprises mapping the customer identification data to the location of the customer profile data containing the stored preference data.

23. The method of claim 20, wherein a verbal answer is a business name and wherein the preferences are stored according to business name data interpreted from the verbal answer, the method further comprising upon subsequent voiced calls between the voice services node and the customer, receiving a business name as a verbal answer from the customer, interpreting the verbal answer to produce business name data, and accessing the preferences for the business name data.

24. The method of claim 15, further comprising: generating confirmation data;
converting the confirmation data to a verbal confirmation; and providing the verbal confirmation from the voice services node to the customer.

25. A system for assisting scheduling with automation, the system comprising:
a voice services node that receives a verbal scheduling request from a customer over a voiced call and provides scheduling request data for the verbal scheduling request, the scheduling request data being based on keywords of the verbal scheduling request received from the customer;
a scheduling database containing data for a current schedule;
a profile database containing preference data comprising information omitted in the scheduling request data, the profile database comprising a profile database storage maintained only at a premises of the customer, the preference data being previously obtained through at least one of the following: previous verbal communication with the customer, data message transaction with the customer, and tracking previous scheduling requests made by the customer, the preference data being used to update the scheduling request data, when the scheduling request data omits the information contained in the preference data, without requiring further customer interaction; and
a network-based computer-implemented scheduling application operative to:
receive the scheduling request data from the voice services node,
receive a scheduling update signal from a schedule owner, the scheduling update signal providing an indication of availability for the current schedule stored in the schedule database, the indication of availability including a quantitative capacity;
formulate a command to the schedule database based on the received scheduling update signal to update the current schedule,
compare the scheduling request data to the data for the current schedule to determine whether the scheduling request data is compatible with the current schedule, wherein the update to the current schedule is considered when determining whether the request is compatible, and
adapt the data for the current schedule based on the scheduling request data when the scheduling request data is compatible with the current schedule.

26. The system of claim 25, wherein the voice services node interprets the verbal request to produce the request data for the scheduling request signal.

27. The system of claim 25, wherein the voiced call is over a public switched telephone network.

28. The system of claim 25, wherein the voice services node receives the verbal scheduling request signal as a wireless data transmission from a wireless device in use by the customer and extracts request data from the verbal scheduling request of the wireless data transmission.

29. The system of claim 25, wherein the network-based computer-implemented application also generates a confirmation that is provided to the customer as a verbal confirmation provided from a voice services node.

30. The system of claim 29, wherein the computer-implemented application also generates a continuation that is provided to the customer as a data message sent over a data network in addition to the verbal confirmation.

31. The system of claim 29, wherein the computer-implemented application also generates a confirmation that is provided to the customer as a fax message provided in addition to the verbal confirmation.

32. The system of claim 25, wherein the computer-implemented application also generates a confirmation that is provided to a schedule owner as a web site displaying the current schedule.

33. The system of claim 25, wherein the computer-implemented application also generates a confirmation that is provided to a schedule owner as a wireless data message provided to a wireless device.

34. A system for assisting scheduling with automation utilizing verbal communication, the system comprising:
a voice services node that converts question data to provide a set of verbal questions for a schedule request to a customer, that receives a set of verbal answers from the customer, and converts the set of verbal answers into request data;
a profile database containing preference data comprising information omitted in the request data, the profile database comprising a profile database storage maintained only at a premises of the customer, the preference data being previously obtained through at least one of the following: previous verbal communication with the customer, data message transaction with the customer, and tracking previous scheduling requests made by the customer, the preference data being used to update the request data, when the request data omits the information contained in the preference data, without requiring further customer interaction;

a schedule database containing schedule data for a current schedule; and a network-based computer-implemented application operative to:
provide the question data to the voice services node,
receive the request data from the voice services node,
receive a scheduling update signal from a schedule owner, the scheduling update signal providing an indication of availability for the current schedule stored in the schedule database, the indication of availability including a quantitative capacity;
update the current schedule based on the received scheduling update;
compare the request data to the schedule data for the current schedule, and
adapt the schedule data according to the request data when the request data is compatible with the schedule data.

35. The system of claim 34, wherein the set of verbal questions includes a question about a business name of interest to the customer.

36. The system of claim 34, wherein the set of verbal questions includes a question about a date and time of day to schedule.

37. The system of claim 34, wherein the set of verbal questions includes questions about customer preferences.

38. The system of claim 34, wherein the network-based computer-implemented application determines preferences of the customer from the request data to produce preference data, and stores the preference data of the customer in the profile database.

39. The system of claim 34, wherein the network-based computer-implemented application generates confirmation data upon adapting the schedule data, and wherein the voice services node converts the confirmation data to a verbal confirmation and provides the verbal confirmation to the customer.

40. A method of assisting scheduling with automation, the method comprising:
receiving a verbal scheduling request from a customer at a voice services node over a voiced call;
formulating request data to a schedule database, the request data being formulated based on keywords of the verbal scheduling request received from the customer, wherein the schedule database maintains a current schedule for multiple businesses, and wherein the schedule database receives scheduling update signals from schedule owners of each of the multiple businesses, the scheduling update signals including a quantitative capacity, and wherein the schedule database updates each of the current schedules according to the scheduling update signals, and the request data is formulated to determine which of the multiple businesses have a current schedule compatible with the verbal scheduling request, wherein formulating the request data comprises:
accessing a profile for the customer form a profile database to determine preferences for the customer, the profile database comprising a profile database storage maintained only at a premises of the customer, the preferences being previously obtained through at least one of the following: previous verbal communication with the customer, data message transaction with the customer, and tracking previous scheduling requests made by the customer, and
including the preferences in the request data, when information contained in the preferences is omitted in the request data, to determine whether the request is compatible with the current schedule, wherein including the preferences comprises:
accessing the profile for the customer from the profile database,
searching for the preferences containing the information omitted in the request data, and
updating the request data to include the preferences containing the information omitted in the request data, wherein updating the request data to include the preferences containing the information omitted in the request data does not require further customer interaction; and
generating a first notification of the result of the request data to provide an indication to the customer of which businesses have a current schedule that is compatible with the request data, wherein the updates to the current schedules are considered in determining compatibility.

41. The method of claim 40, further comprising:
receiving a second verbal scheduling request from the customer at the voice services node over the voice call, wherein the second verbal scheduling request specifies a selected business from the multiple businesses provided in the first notification that have a current schedule compatible with the schedule request;
formulating a query to the schedule database based on the received second verbal scheduling request to alter the current schedule of the selected business according to the scheduling request; and
generating a second notification of the alteration to the current schedule.

* * * * *